Aug. 22, 1961 J. J. LAHM ET AL 2,997,154

DATA HANDLING APPARATUS

Filed Feb. 27, 1959 10 Sheets-Sheet 1

INVENTORS
James J. Lahm and
Dale W. Gardner.
BY
F. E. Browder
ATTORNEY

Aug. 22, 1961 J. J. LAHM ET AL 2,997,154

DATA HANDLING APPARATUS

Filed Feb. 27, 1959 10 Sheets-Sheet 2

Aug. 22, 1961 J. J. LAHM ET AL 2,997,154

DATA HANDLING APPARATUS

Filed Feb. 27, 1959 10 Sheets-Sheet 3

Aug. 22, 1961 J. J. LAHM ET AL 2,997,154

DATA HANDLING APPARATUS

Filed Feb. 27, 1959 10 Sheets-Sheet 4

Aug. 22, 1961 J. J. LAHM ET AL 2,997,154

DATA HANDLING APPARATUS

Filed Feb. 27, 1959 10 Sheets-Sheet 6

Fig. 14. Fig. 15.
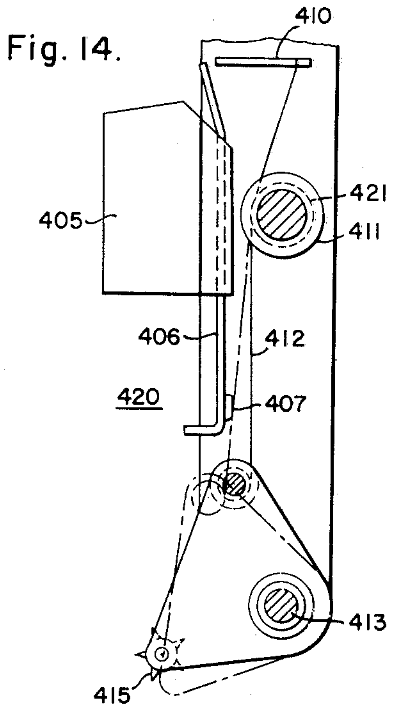
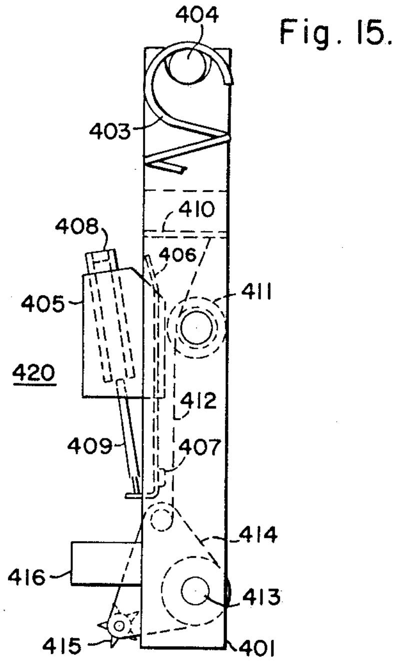
Fig. 16.
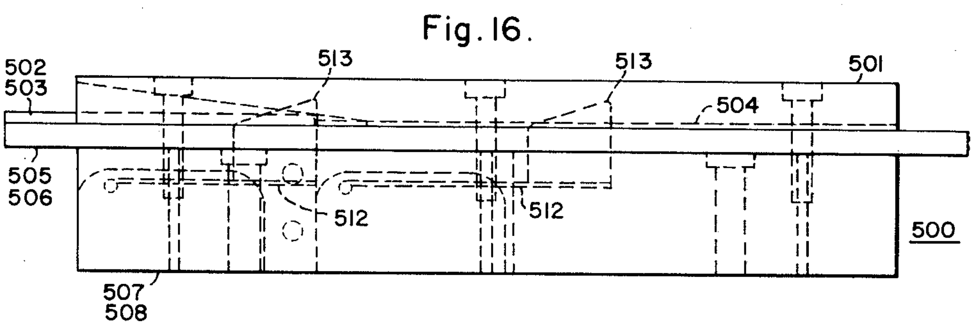
Fig. 18.
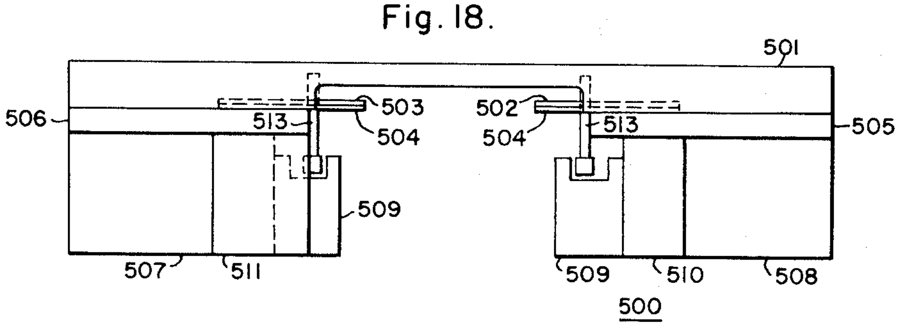

Aug. 22, 1961 J. J. LAHM ET AL 2,997,154

DATA HANDLING APPARATUS

Filed Feb. 27, 1959 10 Sheets-Sheet 9

United States Patent Office 2,997,154

Patented Aug. 22, 1961

2,997,154

DATA HANDLING APPARATUS

James J. Lahm, Brookfield, Ohio, and Dale W. Gardner, Athens, Ga., assignors to Westinghouse Electric Corporation, East Pittsburgh, Pa., a corporation of Pennsylvania Filed Feb. 27, 1959, Ser. No. 796,138
13 Claims. (Cl. 198—19)

This invention relates to data handling apparatus in general and in particular to data handling apparatus which is required to transmit input data from a central source to various work stations at a particular time and in a form which can be utilized by the work stations to program operations or process to be performed or carried out at these stations.

In a number of applications, it is important to perform the above-described operations with the least complex equipment and circuitry as possible, in the most reliable manner and with a minimum of personnel. One application in which a data handling apparatus with these features would be very desirable would be, for example, an automatic test facility in which a number of predetermined test operations are to be performed upon individual workpieces. It is also desirable that more than one workpiece be tested at one time, each workpiece receiving simultaneously a different test. The workpieces might also be different from each other (size, rating, style, etc.) so that the parameters of any particular test would vary according to a predetermined plan (test specification).

In the present embodiment of the invention, punched control data cards represent the source from which the data handling apparatus receives its data. Assume that the workpieces to be tested are transformers and that the tests are performed at test stations located adjacent to a materials-handling system which transports or moves the transformers (workpieces) between successive stations. Since a number of different transformers are being tested simultaneously, each transformer receiving a different test at a different test station, the data handling apparatus would be required to send data from a plurality of different data cards to a plurality of different test or work stations simultaneously. In the past, it has been necessary to "read" all the information from each data card and then store this information in a storage means until needed. This is because only a part of the information on each of the data cards is needed for each of the tests or operations at each station. The information would, then be stepped along, in the storage system in synchronism with the units being tested. Appropriate information would be extracted from the storage system or means as required. The number of storage elements required to store the information at each station for each transformer or workpiece would gradually diminish as a transformer received its tests or the operations at said stations completed. When the last test was programmed, all of the remaining information would be completely utilized. The storage elements mentioned above might be electronic, electromechanical, or magnetic in nature. Such a system, although workable, is both bulky and expensive.

Accordingly, it is an object of this invention to provide an improved data handling apparatus.

It is another object of this invention to provide an improved data handling apparatus which is able to transmit input data from a central data source, for example a data card, to various work stations at the proper time and in a form which can be utilized by the work stations to program the operations or work performed at each of these stations.

It is a further object of this invention to provide an improved data handling apparatus which performs the functions of the last paragraph, yet is less bulky and expensive than apparatus in the prior art and also may be operated with a minimum of personnel and a minimum of training for said personnel.

A more specific object of this invention is to provide a data card reader for simultaneously reading portions of a plurality of data cards in a sequential manner.

Further objects of this invention will become apparent from the following description when taken in conjunction with the accompanying drawings. In said drawings, for illustrative purposes only, there is shown a preferred embodiment of the invention.

FIG. 14 is a side view of a signal actuating mechanism contained in FIG. 13;

FIG. 15 is a side view of the bridge of FIG. 13 showing the placement of FIG. 14 therein;

FIG. 16 is a side view of a card entrance assembly;

FIG. 18 is a front view of FIG. 16;

Figure 1:
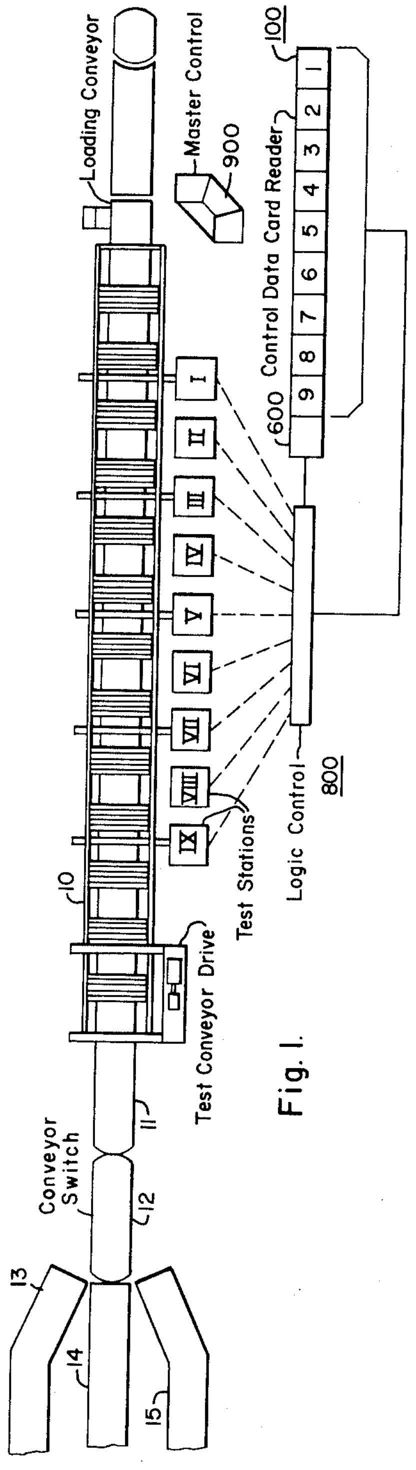
FIGURE 1 is a floor layout of an automatic test facility embodying the teachings of this invention.
Figure 2:
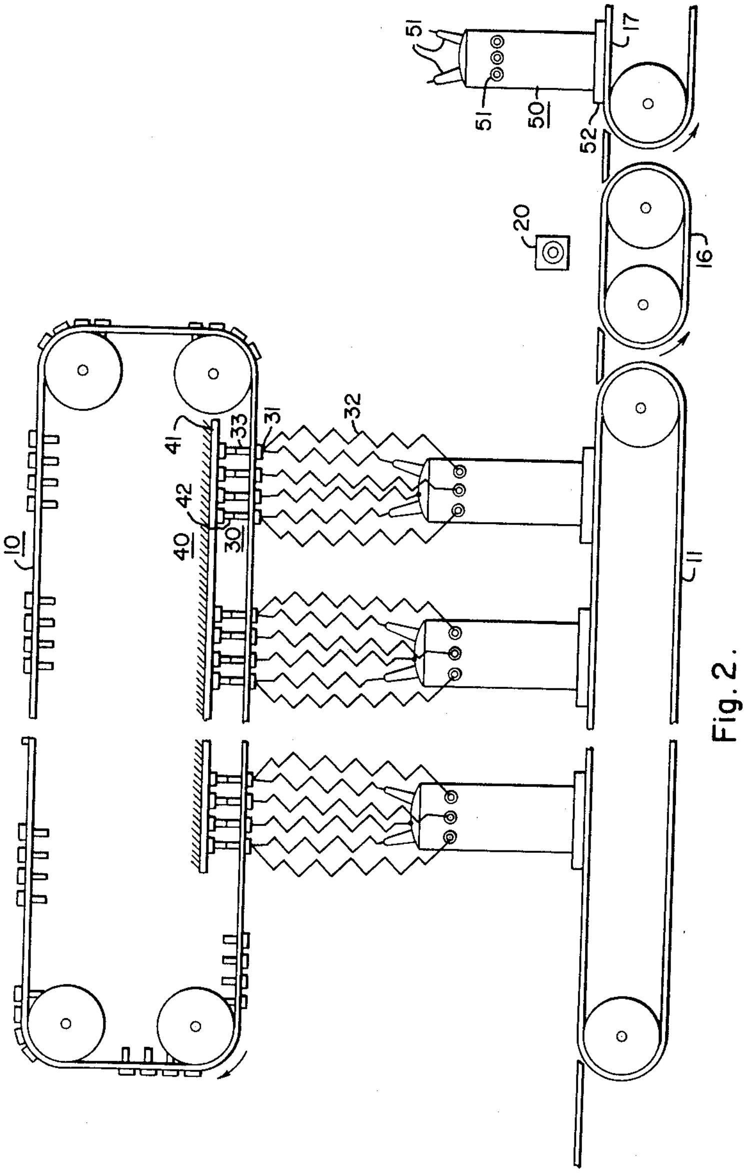
FIG. 2 is a side view of the layout of FIG. 1.

Referring to FIGS. 1 and 2, there is shown the plan and side view of an automatic test facility embodying the teachings of this invention. A workpiece 50, which in this instance is assumed to be a transformer, arrives on the receiving conveyor 17. A sensing mechanism 20, which may be, for example, a photoconductor-electric eye device, senses the arrival or presence of the workpiece or the transformer 50 on the loading conveyor 16. If the workpiece is a transformer, it may be suitably mounted on a platform 52 for easier transportation along the conveyor system. After the transformer 50 is positioned on the test conveyor 11 by loading conveyor 16, the retractile conductors 32 are connected to the various terminals 51 of the transformer 50. The retractile conductors 32 are part of an automatic connecting system 30 which comprises a platform or slats 31 having contacts 33. The retractile conductors 32 are electrically connected to the contacts 33. The platform 31 is attached to a conveyor 10. The test stations I, II, . . . VIII, may be situated adjacent to the test conveyor 11 and the overhead conveyor 10. In this particular embodiment, a connection board arrangement 40 is fixed to the inner side of the conveyor 10 by securing said connection board to the frame of the conveyor 10. A connection board 41 has contacts 42 carried on the bottom of the connection board 41. The contacts 42 are disposed to engage the contacts 33 of the platform 31, when the conveyor 10 moves said platform 30 into a position for the first test or operation. The contacts 42 are electrically connected to the test equipment contained within each test station which is designed to perform a predetermined test upon the transformer 50. The test conveyor 11 transports the transformer 50 between successive stations while they are being tested. The values and parameters of these tests may vary as directed by a data card.

An operator selects a data card which corresponds to the transformer 50 just loaded and connected at the connecting station of the test conveyor 11. The data card is most easily identified by having a serial number of the transformer or workpiece 50 placed upon the card. The data card for the transformer 50 is inserted into the data card reader 100 shown on FIG. 1 and the testing cycle begins.

Figure 20:
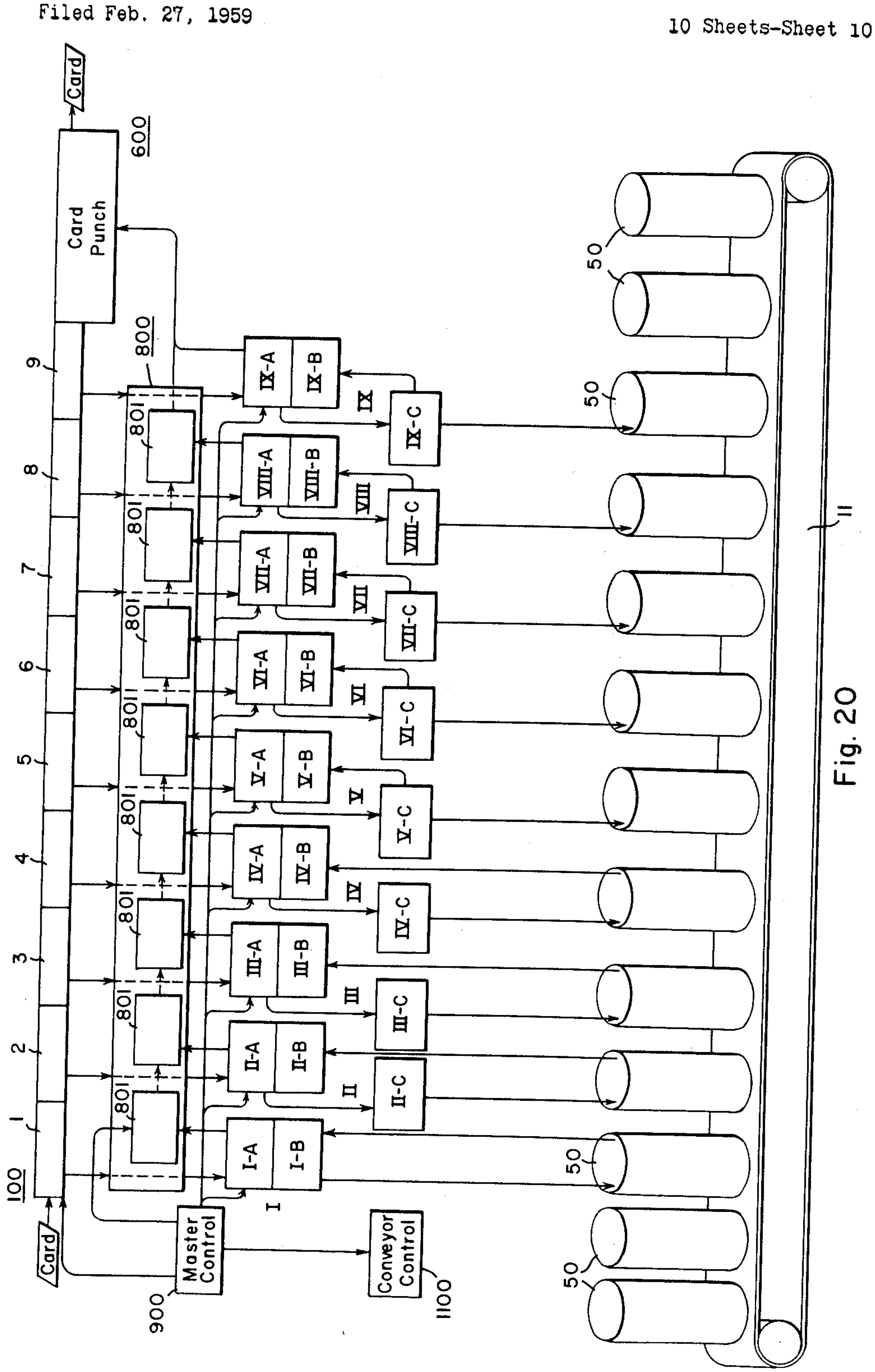
FIG. 20 is a block diagram showing the functional layout of an automatic test facility which illustrates one application of the teachings of the invention.

The data card reader 100 is the heart of the data handling apparatus. It transmits data from a plurality of cards to a like plurality of corresponding test stations at the same time. In the embodiment shown in the present invention, the data card reader 100 is a miniature indexing conveyor equipped with reading devices at the first nine stations. It is similar to the main or test conveyor 11 except that it handles cards instead of transformers or workpieces. The data card reader 100, the test conveyor 11 and the overhead conveyor 10 are synchronized so that as the transformer 50 passes through the test facility, its corresponding data card passes through the card reader 100. Since each of the reading stations 1 to 9 of the data card reader 100 is equipped with reading devices, only a predetermined portion of the data card, the portion which is pertinent to that particular station, is read at that reading station. This eliminates the need for storing all of the input data on the card in electronic, electromechanical, or magnetic storage elements. A logic system 800 as noted in the floor layout and the block diagram of FIGS. 1 and 20, respectively, is connected between or is the link between the data card reader 100 and the test stations I to IX. The logic system 800 receives the signals from the data card reader 100 and applies predetermined logic or control signals to program and control or actuate the individual test stations. The logic system 800 may also store the test results in the data storage elements 801, as indicated in FIG. 20, as the tests are performed until all tests are completed, at which time the test results may be punched into the data card corresponding to the transformer 50 that has just been tested by the punching means or device 600. For example, in this particular embodiment, the results of nine different tests or operations performed on one transformer 50 at nine different times at the stations I to IX may be collected in the logic system 800 and, then, recorded at one time on the corresponding original data card.

When the transformer or workpiece 50 reaches the end of its test or work cycle, it is automatically or manually disconnected from the retractile conductors 32, and according to its test performance is shuttled by the conveyor switch 12 to a "defective unit" conveyor 13, a "good unit" conveyor 14, or an "additional test" conveyor 15.

Figures 3, 4, 5:
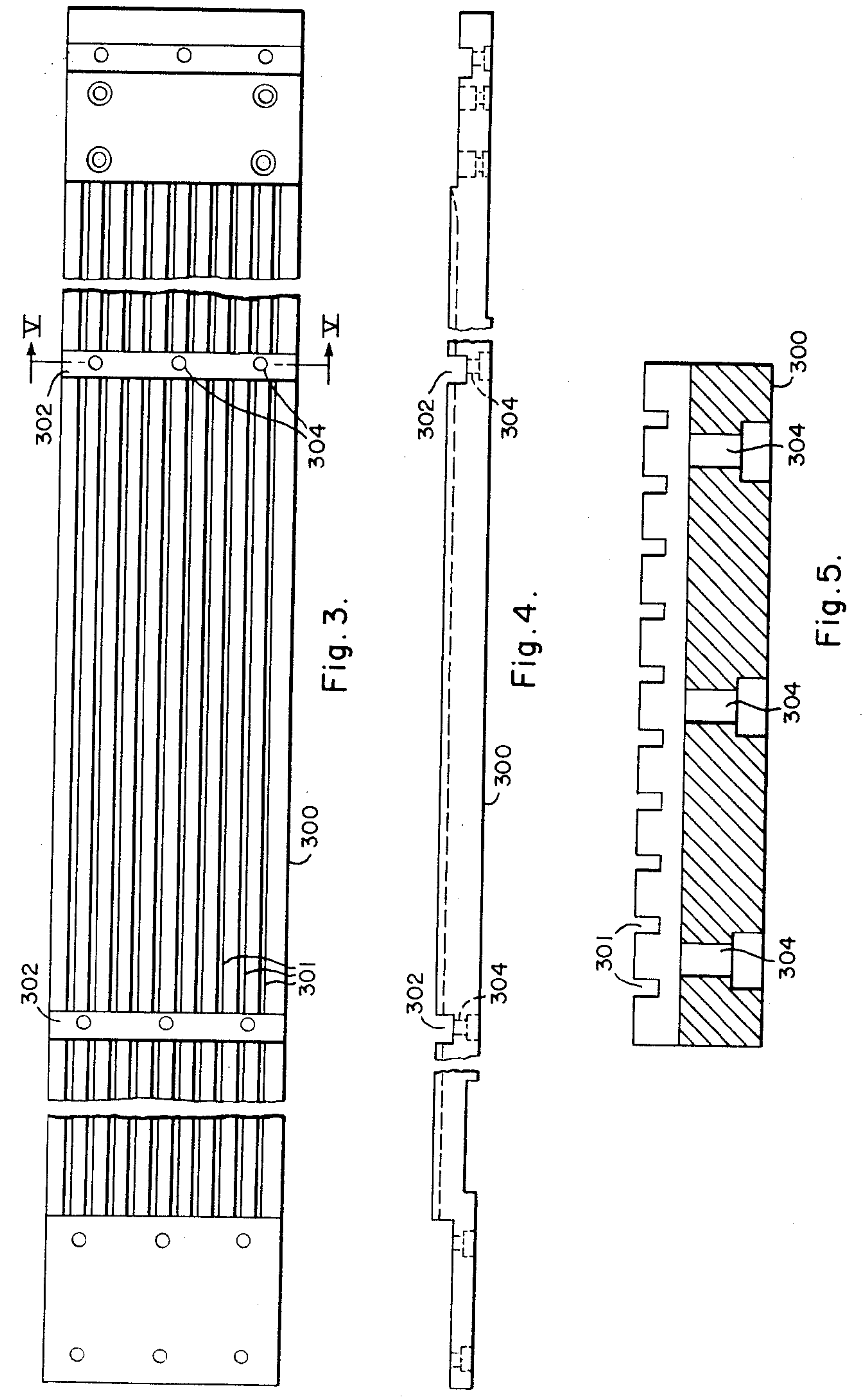
FIG. 3 is a plan view of a slider arrangement which is utilized in the present invention.
FIG. 4 is a side view of FIG. 3.
FIG. 5 is a cross section of FIG. 3 taken at the points A—A.

Referring to FIGS. 3, 4 and 5, there is shown a slider member 300 which advances the data cards in intermittent or step by step fashion through the data card reader 100. The slider comprises an elongated rectangular metal member 300 having a plurality of axial grooves 301 formed therein. At corresponding intervals throughout its length, a number of transverse grooves 302 are formed in the slider member 300 to permit insertion of card pushers 305 to be described hereinafter. FIG. 5 shows a cross section of the slider member 300 taken along the line V—V of FIG. 3. This cross sectional view permits a clearer view of the axial grooves 301 formed in the slider member 300. The tapped holes 304 are shown as an example of a suitable means to fasten or attach a finger pusher 305 in the grooves 302 of the slider 300.

Figure 7:
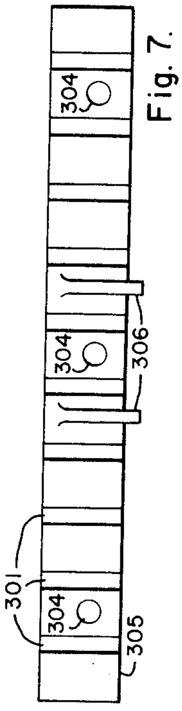
FIG. 7 is a plan view of FIG. 6.
Figure 6:
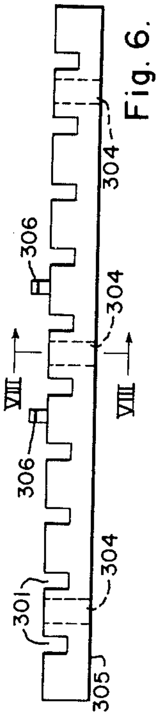
FIG. 6 is a front view of a card pusher to be utilized in this invention.
Figure 8:
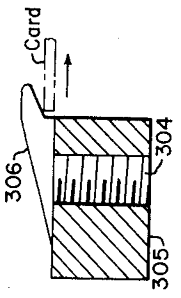
FIG. 8 is a cross section of FIG. 6 taken at the points B—B.

FIGS. 6, 7 and 8 show front, plan and cross sectional views, respectively, of the finger pusher 305. The finger pusher 305 is designed to be the width of the slider member 300 and to fit into the transverse grooves 302 of the slider 300. A like number of axial grooves 301 which correspond to the axial grooves 301 of the slider member are formed in the finger pusher 305. The grooves 301 permit the actuating of the signal mechanism in a manner to be described hereinafter. A plurality of finger extensions 306 are mounted on top of the finger pusher member 305 to advance a data card in the direction in which the fingers 306 are inclined. When the slider 300 is moved in the direction indicated for the direction of the card in FIG. 8, the fingers 306 of the pusher members 305 are inclined in the direction of the card movement. The card fits in front of and below the fingers 306 as is best shown in FIG. 8. When the slider 300 is advanced to its fullest, a card stop mechanism 130, to be described hereinafter, drops into the grooves 301 behind the card on the slider. Thus, whenever the slider 300 returns to its original position the card is prevented from returning with the slider 300. As is shown in FIG. 8, the fingers 306 are inclined in the direction of the card movement to allow the fingers 306 to come back beneath the card without moving from the card its newly attained or newly indexed position.

Figure 9:
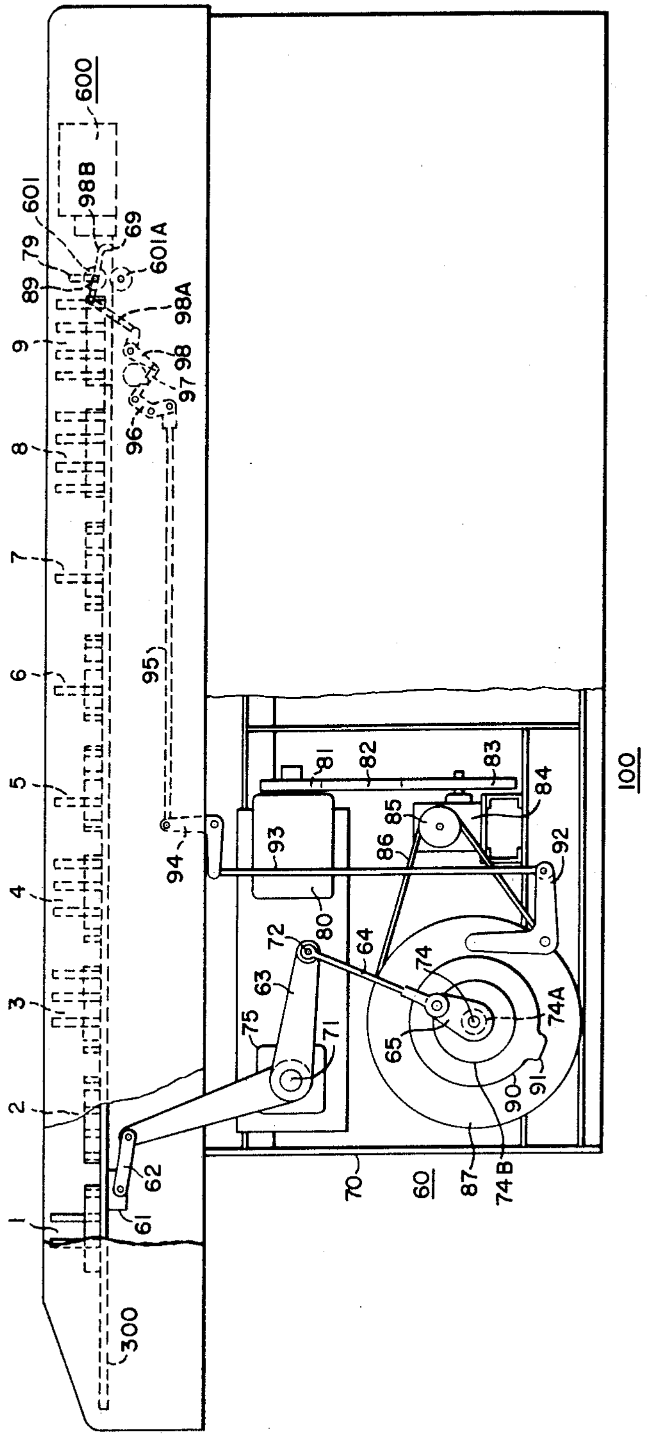
FIG. 9 is a side view of a data card reader in accordance with this invention showing the relative positions of the different mechanisms and assemblies in general, and, in particular a reciprocating mechanism for advancing and returning the slider mechanism shown in FIG. 3.

Referring to FIG. 9 there is illustrated a reciprocating mechanism 60 which advances and returns the slider 300 when the conveyors 10 and 11 are simultaneously indexed from test station to test station. A block member 61 is connected to the under side of the slider 300 by suitable means such as bolts or welding. A connecting link 62 is pivotally attached to the member 61 and a rocker arm assembly 63. The rocker arm assembly 63 is mounted on a shaft 71 which is pivotally supported by the supporting means 75. The supporting means 75 is suitably attached to the cabinet 70 which contains the reciprocating mechanism 60. The rocker arm 63 is stationary with respect to the shaft 71 forming a bell crank. A connecting rod 64 is pivotally connected to the rocker arm 63 by a shaft 72 and is also pivotally connected to a rotating arm member 65. The rotating arm member 65 is mounted on a shaft 74 and is stationary with respect to the shaft 74. The shaft 74 is the output shaft of a single revolution clutch 74B, the input of which is a substantially coaxial shaft 74A. A pulley 87 is mounted on and is stationary with respect to the shaft 74A. The pulley 87 is driven by the belt means 86 which is also connected to a pulley 85 of a gear box mechanism 84. The gear box mechanism 84 is driven by a motor 80 having a pulley 81 mounted upon the motor shaft and a belt 82 connecting the pulley 81 to a pulley 83 of the gear box assembly 84.

When the card reader 100 is operating, the motor 80 runs continuously causing the pulley 87 which is driven through the gear box 84, to revolve continuously. A microswitch assembly which is actuated by the insertion of a card into the data card reader 100 and which will be shown hereinafter, detects the presence of a card. When the presence of a card in the card reader 100 is detected by said microswitch assembly, actuating associated means, such as a pushbutton (not shown), energizes the clutch 74B and mecshanically couples the input shaft 74A to the output shaft 74 for one complete revolution of said output shaft which is driven by the pulley 87 for said revolution. When the output shaft 74 makes one complete revolution, the arm 65 rotates for one revolution and operates through the rod 64, the rocker arm 63 and the connecting link 62 to advance and return the connecting block member 61 and the slider 300 a predetermined distance. This predetermined distance is sufficient to move a data control card from one reading station of the data control card reader to the next and is termed "indexing" the card as well as "indexing" the test conveyor 11 from position to position.

When a card is indexing from the next to last reading station 8 to the last station 9, the rollers 601 must be opened to allow complete admittance of the data card to the last reading station 9. The rollers 601 are later used to advance the data control card from the last reading station 9 into a punching mechanism or means 600 which punches into the data card the test or work results on the workpiece as gained from the storing means 801 in the logic system 800, shown hereinbefore. In order to separate the rollers 601 and allow the admission or entrance of the data control card into the reading station 9, a disc 90 is mounted on and is stationary with respect to the shaft 74. A cam 91 on the disc 90 actuates the cam follower 92 and through the connecting rod 93, the rocker arm 94, the connecting rod 95, the rocker arm 96 and the linkages 97, 98, 98A, and 98B which are pivotally joined to each other, the rollers 601A and 601 are separated. In particular, the linkage 98B which bears against the pivot point 69 is connected to the shaft 89 of the roller 601 and raises the roller 601 away from the roller 601A against a biasing spring 79, which bears downward against the shaft 89, to thereby separate said rollers and permit the data card to completely enter the reading station when the reciprocating mechanism 60 causes the slider 300 to advance said card and actuates the linkage 98B as just described. After the cam 91 passes the cam follower 92 to thereby permit the return of the roller 601 to its normally closed position with respect to the roller 601A, the pressure of the biasing spring 79 against the shaft 89 of the roller 601 returns said roller to its normally closed position. The rollers 601 and 601A will then grip said card which will be drawn into the punching means 600 when the roller 601A is caused to rotate in a clockwise direction. This mechanism, of course, will be used when punching means are required to punch the test information or operations results in the data card.

Figure 10:
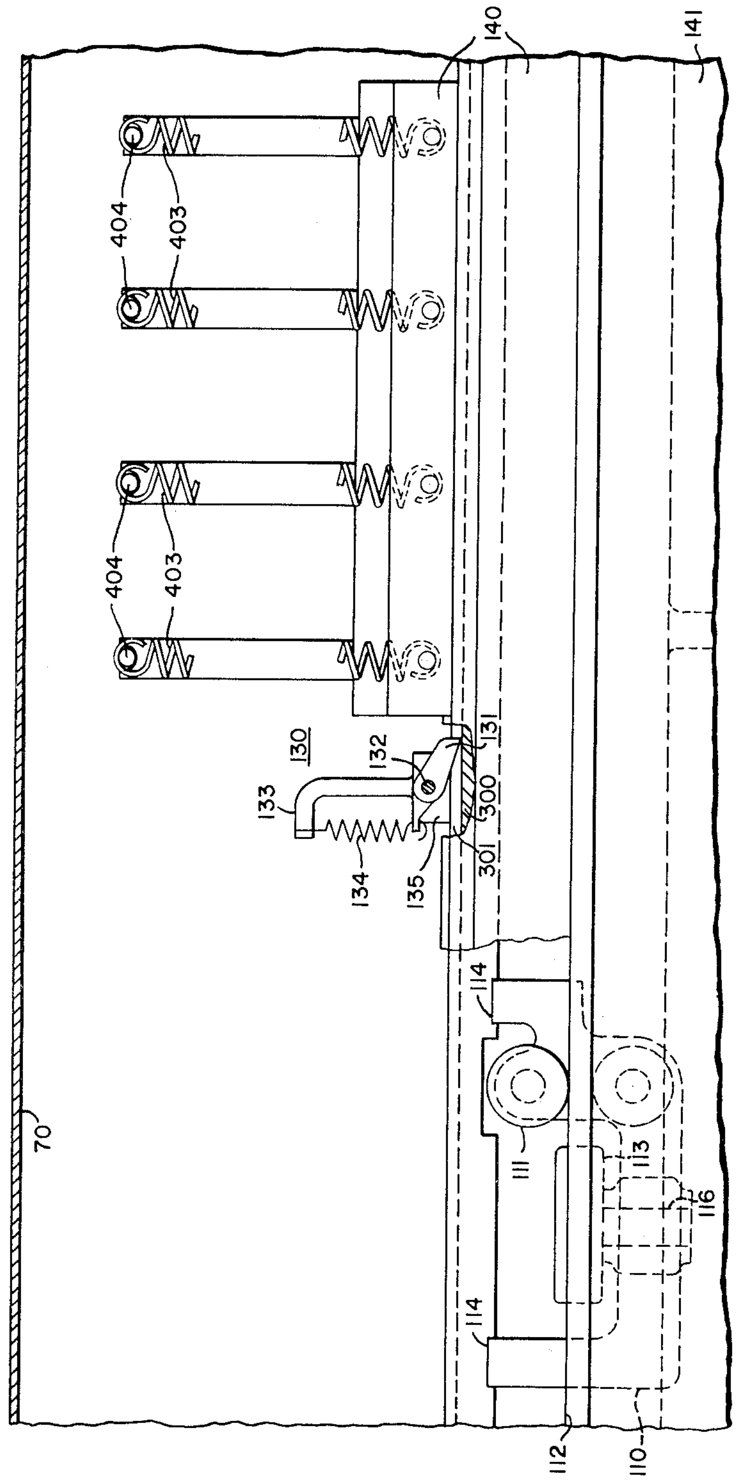
FIG. 10 is a side view of a rider, card stop mechanism, and a single reading station assembly.
Figure 11:
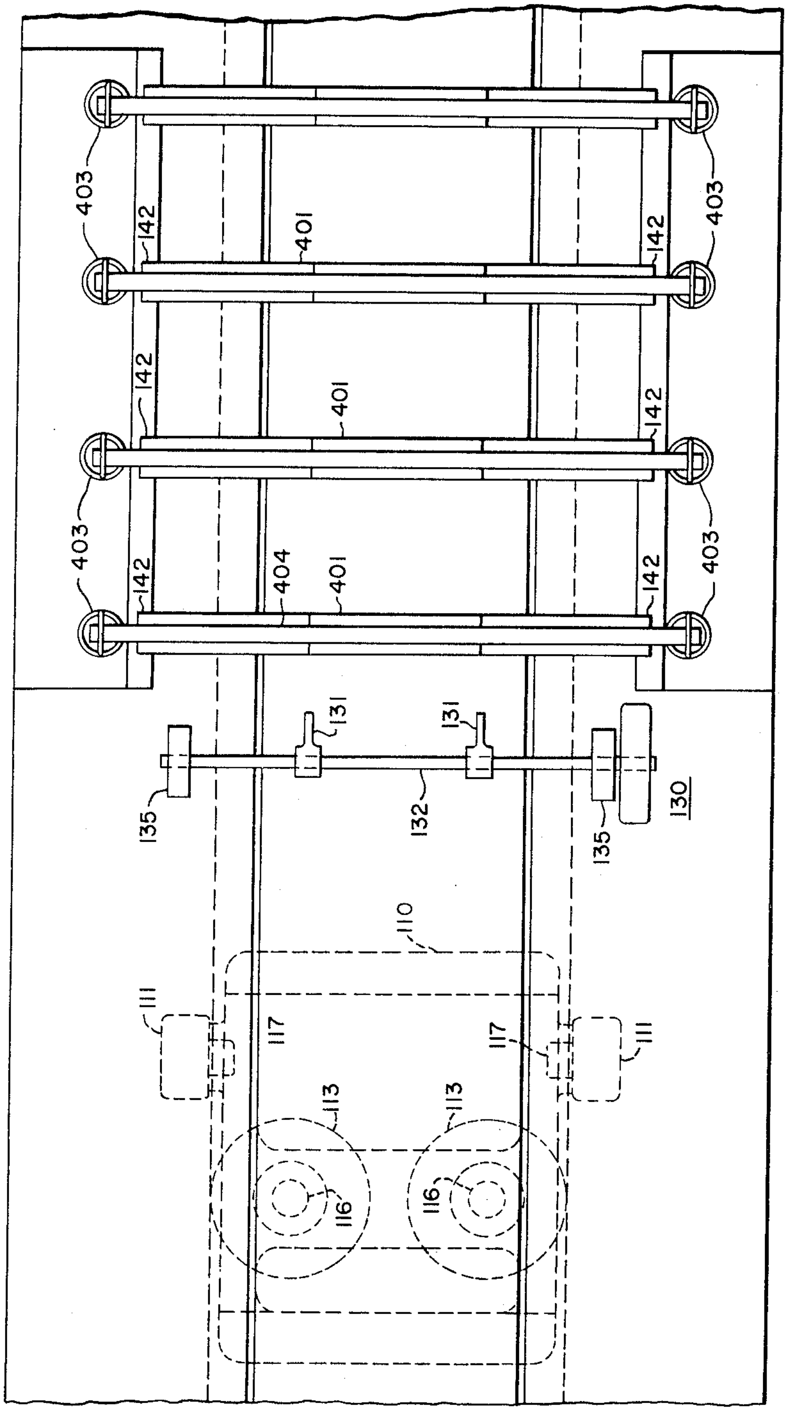
FIG. 11 is a plan view of FIG. 10.
Figure 12:
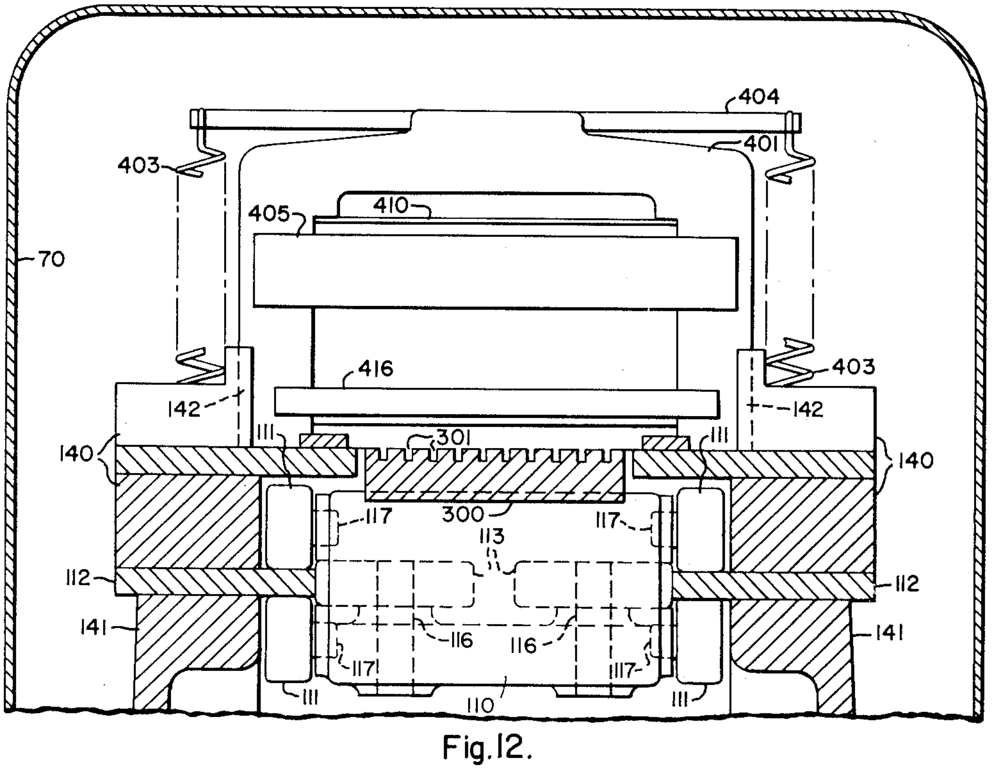
FIG. 12 is an end view of FIG. 10.

Referring to the FIGS. 10, 11 and 12, there is shown a rider mechanism 110 which is suitably connected to the slider 300 by means 114 which prevents vertical and lateral displacement of the slider 300 during an indexing cycle. A track means 112 is supported between the bridge carrying bed 140 and the bench means 141 which supports the entire data card reading assembly. The bench means 141 may be connected or attached to the cabinet means 70. The rider 110 carries a pair of wheels 113 which are pivotally supported by suitable means 116 on the rider 110. The wheels 113 bear against the track means 112 and prevent lateral displacement of the slider 300 and the rider 110 which is connected to the slider 300. A pair of wheels 111 for each side of the rider 110 ride above and below the track means 112. The pairs of wheels 111 are suitably pivotally mounted on the rider 110 by the bearing mechanism 117. The wheels 111 with their associated bearing mounting means 117 prevent vertical displacement of the rider 110 and the connected slider 300 during the indexing cycle of the data card reader.

Also shown in FIGS. 10, 11 and 12 is one of the reading stations 1 to 9 and relative positions of a plurality of bridge members 401 which will be described in more detail hereinafter.

Also shown in FIGS. 10 and 11 is the card stop mechanism 130 which prevents the return of a data control card as the slider 300 is being returned to its original position. The card stop mechanism 130 comprises a ratchet 130 which is pivotally mounted upon a shaft 132. The shaft 132 is held in position at the desired level above the slider bed 300 by mounting means 135 which are connected to the bridge carrying bed 140 on each side of the slider 300. The ratchet 131 is spring loaded by means of the spring support 133 to keep the ratchet 131 within the grooves 301 of the slider 300. As may be seen from the drawing, whenever the slider 300 is advanced, a card will lift the ratchet 131 from a slot 301 until the data card has passed the ratchet 131. When the card passes the ratchet 131, it drops again into the slot 301 and the data card is prevented from returning with the slider 300 as the slider returns to its original position.

As shown in FIG. 12, the bridge 401 may be held securely within the slots 142 of the bridge bed 140 by means of a rod 404 carried in a groove formed in the top of the bridge 401. The rod 404 is held against the bridge 401 under tension provided by the springs 403 which are connected between the bridge carrying bed 140 and the rod 404. By providing this means of securing the respective bridges 401 into predetermined slots 142 in the bridge carrying bed 140, insertion or removal of a bridge 401 for inspection, new data sensing positions, or maintenance is easily accomplished.

Figure 13:
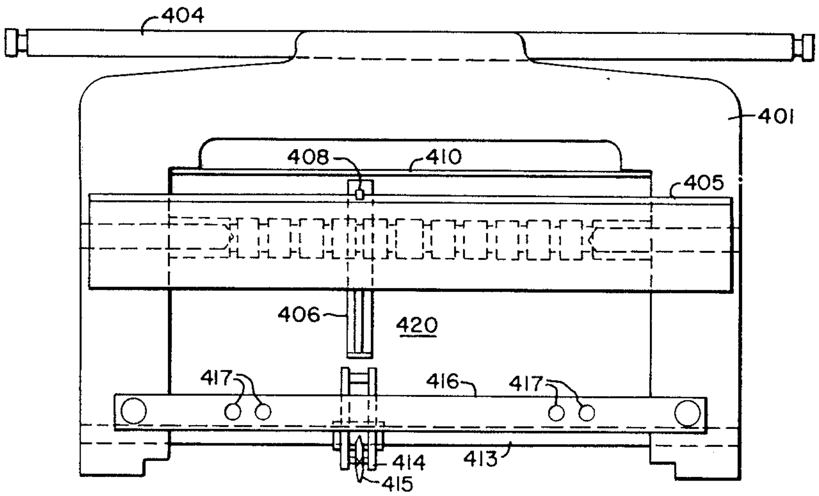
FIG. 13 is a front view of the bridge assembly of a reading station.

Referring to FIGS. 13, 14 and 15, there is shown a bridge 401 and associated assembly. FIG. 13 shows a front view of the bridge 401 with a card reading mechanism 420 in place. FIG. 14 shows a side view of the card reading mechanism 420. FIG. 15 shows a side view of the bridge assembly with the card reading mechanism 420 in place. Although the card reading mechanism 420, as shown for this particular embodiment of the data card reader, is illustrated as a mechanism for detecting the presence or absence of a data card and also the presence or absence of a punched hole within said data card, it is to be noted that other card reading means may be utilized in connection with the data card reader. For example, photocells may be utilized to gain the same information from a punch card. Other data card reading means would include a conductive brush feeling mechanism detecting the presence of an electrically conductive mark made upon a data card rather than holes in said card. The card reading mechanism 420 comprises a contact bar guide 405 supporting a contact bar 406 which carries thereon a silver or other suitable electrically conducting metal contact 407. A pawl assembly 414 is pivotally mounted on a shift 413 and carries a star wheel 415, as shown in FIG. 14. A wire contact strap 412 is connected between a wire anchoring means 410 and the pawl assembly 414 as shown. The wire contact strap 412 is held in a position to prevent lateral displacement by a wire guide 411 having formed therein a groove 421 to receive said contact strap.

FIG. 14 shows the strap 412 making contact with the contact 407 when the star wheel 415 has dropped into a punched hole in a data control card. This position is shown by the dotted lines in FIG. 14. When there is no punched hole in the data card 415, the just-named items will be in the positions shown by the solid lines and, thus, the strap 412 will not be in contact with the contact 407. The contact 407 is connected to a suitable signal source which may be for example a direct current electrical power supply which delivers a signal to the logic system 800 shown in FIG. 1 when a hole is present in the data card and the electrical circuit comprising the contact 407 and the wire contact strap 412 is completed. If a direct current electrical signal were being used, one side of the D.-C. supply could be connected to ground. The other side of said supply could be connected to said contact 407 through a load or other suitable device to deliver a signal to the logic system 800. Thus, when the contact 407 is grounded to the strap 412, the circuit is completed. The contact bar 406 may be adjusted in the position relative to the unpunched card position of the wire contact strap 412 as noted by the solid lines of FIG. 14 by means of a contact adjusting screw 408 and a contact adjusting pin 409 supported by the contact bar guide 405. The pivot shaft 413 is suitably mounted on or attached to the bridge 401, as shown in FIGS. 13 and 14. A bar 416 may be connected across the lower portion of the bridge 401 as shown to carry a plurality of pawl alignment pins 417. The pawl alignment pins 417 are utilized to place the pawl assembly 414 in the desired predetermined position to detect the presence or absence of a punched hole in a particular column or row on the data card.

Figure 17:
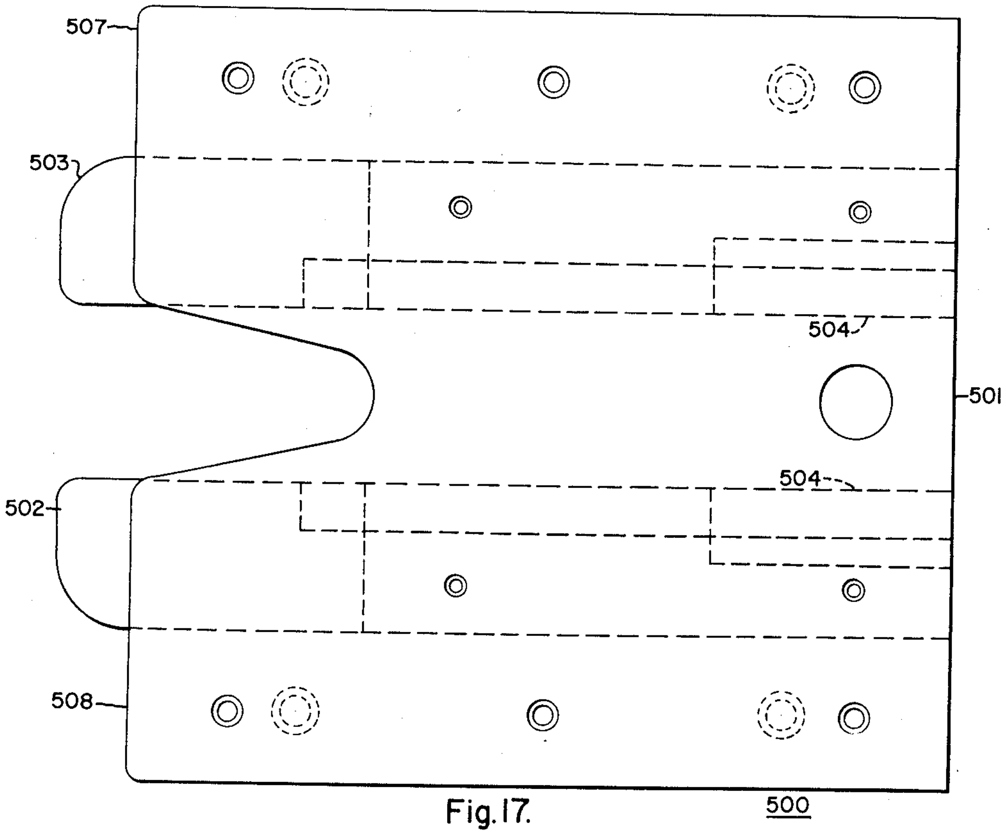
FIG. 17 is a plan view of FIG. 16.

Referring to FIGS. 16, 17 and 18, there is shown a rear view, a plan view and a front view of the card entrance assembly 500. The position of the card entrance assembly 500 with respect to the slider member 300 and the remainder of the data card reader 100 is shown in FIG. 9 which is a side view of the data card reader 100.

The card entrance assembly 500 comprises support pads 502 and 503 and the data card support 504 for supporting and aligning a data card as it is introduced on the slider 300. Upon introduction of the data card, the switch trips 513 actuate the microswitch assemblies 509 through the cooperation of the switch levers 512. The signal then given by the microswitchs 509, which are attached to the assembly 500 by the supports 510 and 511, to the master control 900 of FIG. 1 automatically indicates that the data card reader 100, including the slider 300, is ready for an indexing cycle in synchronism with the conveyors 10 and 11. With the passage of the data card to reading station 1, the switch trips 513 rise and the microswitches 509 stop sending the signal to the master control 900 shown in FIG. 1 and are ready for the next card insertion.

A transparent cover 501, for example one formed from a clear plastic material, is mounted over the assembly to prevent obstructions and accidental triggerings of the mechanism, yet still gives a clear view of the assembly 500 in operation for trouble-shooting purposes.

Figure 19:
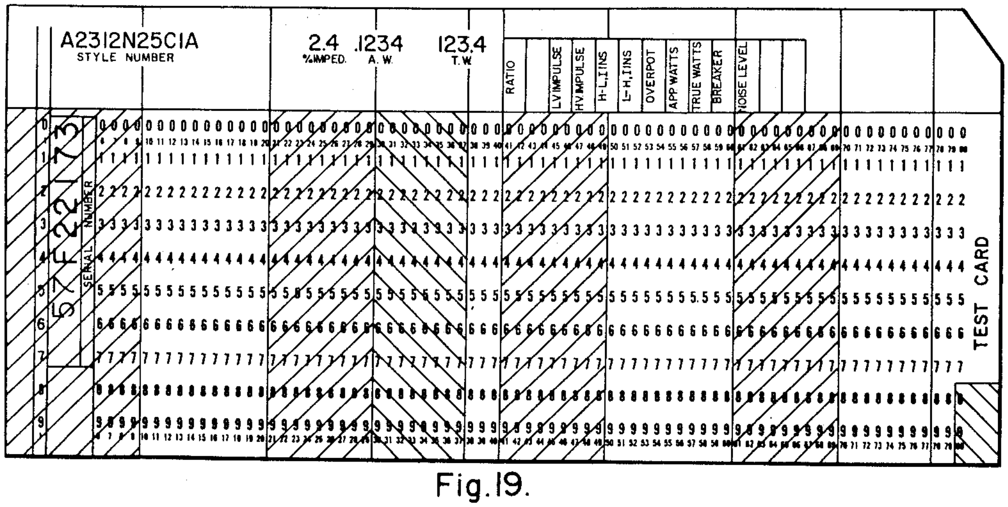
FIG. 19 is an illustration of a layout form for a control card which may be utilized in this invention.

Referring to FIG. 19, there is shown a data card and the areas in said data card which may contain particular information to be transmitted by each reading station to the logic system 800 shown in FIG. 1. For example, the data card may contain, in the areas shown, prepunched input test information or work instructions for programming tests or operations on a workpiece, other prepunched information, such as a style number and serial number, and positions or space for punching tests results into or otherwise recording results on the data card after the workpiece or transformer has completed the test cycle or operation and the data card is positioned in the punching mechanism 600 by the rollers 601 and 601A.

Reviewing the operation of the facility as a whole, we see that the workpieces or transformers 50 may be loaded onto the test conveyor 11 which transports them while they are being tested and connected to the retractile conductors 32 as shown in the functional block diagram of FIG. 20. An operator selects a data card which corresponds to the workpiece that he has previously loaded on the conveyor 11. After the data card is inserted into the data card reader 100, the operator actuates the proper push switch or means (not shown) on the master control 900 which actuates the indexing of both the conveyors 10 and 11 through the conveyor control means 1100 and the data card reader 100. The testing or work cycle then begins. As the first workpiece 50 moves into the test or work station I, the operator loads and connects a second workpiece and inserts its corresponding data card into the data card reader 100. Insertion of the latter data card into the data card reader 100 makes said reader ready for the initiation or actuation of the second test or work cycle after the first test or work cycle has been completed on the first workpiece 50. The first workpiece 50 receives the second test or operation at the test or work station II while the second workpiece receives a test or operation at the test or work station I. This sequence of operations may continue until the conveyor 11 is fully loaded. The overall operation of the facility has then proceeded to the point where each of nine workpieces 50 on the conveyor 11 receives a different test or operation with the programming information for the tests or work operations being transmitted from nine different data cards simultaneously. The data card corresponding to the first transformer or workpiece 50 will be ejected or available from the data card reader 100 at the same time that the first transformer or workpiece 50 comes off the test conveyor 11 from the test station IX.

As best shown in FIG. 20, it should be noted that each of the test stations I to IX comprises a main test control means, as indicated at I–A to IX–A, respectively, for the test stations I to IX, respectively, which is actuated by control signals in accordance with the portion of the data on the data cards being read at the corresponding reading stations 1 to 9, respectively, of the data card reader 100, and a test or operations result detector as indicated at I–B to IX–B for the test stations I to IX, respectively. As indicated functionally in the block diagram of FIG. 20, the result detectors I–B to IX–B included in the test stations I to IX, respectively, may be employed to receive data indicating whether or not the test or operation on the workpieces 50 by each of said test stations was either satisfactory or unsatisfactory. The result data received by the result detectors I–B to IX–B may then be transmitted to the storage means 801 included in the logic system 800 and recorded by the punching means 600 after each data card and its associated workpiece have been completely processed or otherwise subjected to a predetermined number of operations. The test stations II to IX may also include the electrical testing supply means II–C to IX–C, respectively, as indicated in FIG. 20, in order to supply the necessary electrical tests or operations to the workpieces 50 when said test or work stations are actuated by the master control 900 and the data received from the data card reader 100.

Although the test conveyor 11 is illustrated in FIGS. 1, 2 and 20 as being of the straight-through or straight-line type, it is to be understood that in certain applications that the conveyors 10 and 11 may be arranged in a circular form or path, such as a carousel, to reduce the space required by the overall test or production facility.

As an example of an operation or test which may be performed at a typical work or test station of an over-all assembly or production facility, the test or work station V may be considered. The test or operation to be performed at the test station V might call for the application of a test voltage to the windings of certain of the transformers or workpieces 50. It is to be understood that for some of the transformers or workpieces 50, the latter test or operation may be omitted. The data read from the associated data card would program or set up the test station V before the conveyors 10 and 11 had completed their indexing cycle or movement. Following the completion of the indexing of the conveyors 10 and 11, a test or control pulse would be applied from the reading station 5 of the reader 100 to the test station V to start the test or work cycle at the station V. The applied test voltage at the test station V would next increase uniformly from zero volts or a negligible value to a predetermined value. The latter test voltage would then be maintained at the predetermined value for a predetermined time interval. Following the predetermined time interval, the test voltage would gradually be reduced or decreased to a negligible or zero value. In order to program or set up the latter test, the following data would be required from the associated data card at the reading station 5: (1) One of six maximum test voltages would be selected in accordance with the data on the data card; (2) the data on the card would make one of two choices as to whether to omit this particular test or to perform this particular test. The first of the latter selections determines the maximum test voltage which will be applied to the transformer or workpiece 50 at the test station V. The second selection determines whether or not the test is to be performed at all on the workpiece at the test station V. The data required to make the above selections would be read by the reading station 5 from certain predetermined columns of the data card, which is best shown in FIG. 19, and transmitted to the test station V through the logic control system 800.

In summary, in a data handling apparatus as disclosed for simultaneously transmitting data from a plurality of data cards to a plurality of work stations at which a plurality of simultaneous operations are to be performed on a plurality of corresponding workpieces in a predetermined sequence, means must be provided for moving said workpieces between successive work stations in a step by step, predetermined sequence. In addition, a data card reader must be provided having a plurality of card reading stations, each of said reading stations corresponding to one of said work stations and including means for indexing said data cards between successive reading stations in synchronism with the movements of the associated workpieces between successive work stations. Finally, control means for actuating the operation of the indexing means of the card reader and the means for moving said workpieces in synchronism, as well as control means for actuating the operation of each work station on said workpieces in sequence and in response to the data read by and transmitted from the corresponding reading station of said card reader must be provided. In general, it is to be noted that the latter control means is connected between the card reader and said work stations.

As disclosed, the data is taken from the data card at the exact time it is needed. If it were not for the data card reader 100, it would be necessary to read this data at the time the card was first inserted in the data card reader 100 and remember it until the transformer or workpiece 50 had proceeded to the various test stations in succession. The above described example of a typical test or work operation to be preformed at the test or work station V requires a plurality of bits of information to program the test. In the case of other tests or operations which might be performed at the other test or work stations, the number of bits or quantities of information required would vary with the particular test or operation. The quantity of data associated with each transformer or workpiece 50 would have to be remembered for several indexing cycles and would otherwise require a large plurality of storage elements which is a function of the number of test stations and the bits of information associated with each test or work operation. The data card reader 100 obviates the need for the latter storage elements.

It should be apparent that the data card reader 100 in cooperation with the balance of the data handling system described represents a straight-forward, inexpensive, and yet flexible method of programming sequential operations. So long as the data card is properly selected by an operator to correspond to the unit or workpiece receiving the testing or other operation, the units or workpieces may be completely intermixed.

It is to be noted that the punching means 600 shown in FIGS. 1, 2 and 20 is of the general type which is described in detail in U.S. Patent 2,647,581.

Since numerous changes may be made in the above-described apparatus and circuits and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. A data handling apparatus for simultaneously transmitting data from a plurality of central data sources to a plurality of work stations for simultaneously processing associated work materials in accordance with the data from said sources comprising, a multi-station data card reader having a reading station corresponding to each of said work stations for simultaneously reading a portion of a plurality of said data sources in a sequential manner, first means for simultaneously moving said work materials to each of said work stations in a predetermined order, said reader having second means for indexing said data sources between successive reading stations in synchronism with the associated work material, control means for simultaneously actuating said work stations in response to the data simultaneously read and transmitted from said data sources at the corresponding reading stations of said reader, said control means being connected between said reader and said work stations.

2. A data handling apparatus for transmitting predetermined data from a plurality of data cards simultaneously to a plurality of work stations for simultaneously performing predetermined operations on corresponding workpieces at each of said stations in accordance with the data on said cards comprising, a data card reader having a plurality of reading stations corresponding to the respective work stations for simultaneously reading a portion of a plurality of data cards in a sequential manner, first means for simultaneously moving said workpieces between successive work stations in a predetermined sequence upon completion of the operations on said workpieces at said stations, said reader including second means for indexing said cards between successive corresponding reading stations in synchronism with the movement of the associated workpiece by said first means, control means for simultaneously actuating the operation of each work station on said workpieces in response to the data simultaneously read by and transmitted from the corresponding reading stations of said reader, said control means being connected between said reader and said work stations.

3. A data handling apparatus for transmitting predetermined data from a plurality of data cards to a plurality of test stations for performing predetermined tests on corresponding workpieces at each of said stations in accordance with the data on said cards comprising, a control data card reader having a plurality of reading stations corresponding to the respective test stations for simultaneously reading a portion of a plurality of data cards in a sequential manner, first means for simultaneously moving said workpieces between successive test stations in a predetermined sequence upon completion of the tests on said workpieces, at said stations, said reader including second means for simultaneously indexing said cards between successive corresponding reading stations in synchronism with the movement of the associated workpiece by said first means, control means for actuating the test of each test station on said workpieces in response to the data simultaneously read by and transmitted from the corresponding reading stations of said reader, said control means being connected between said reader and said test stations.

4. A data handling apparatus for simultaneously transmitting data from a plurality of data cards to a plurality of work stations at which a plurality of operations are to be performed on a plurality of corresponding workpieces in sequence comprising, first means for moving said workpieces to each of said work stations in a predetermined sequence, a data card reader having a plurality of card reading stations for simultaneously reading a portion of a plurality of data cards in a sequential manner, each of said reading stations corresponding to one of said work stations, said reader including second means for simultaneously indexing said data cards between successive reading stations in synchronism with the movement of the associated workpiece between successive work stations, first control means for actuating the operation of said first means and said second means in synchronism, second control means for simultaneously actuating the operation of each work station on said workpieces in sequence in response to the data simultaneously read by and transmitted from the corresponding reading stations of said reader, said second control means being connected between said reader and said work stations.

5. A data handling apparatus for simultaneously transmitting data from a plurality of data cards to a plurality of test stations at which a plurality of tests are to be performed on a plurality of corresponding workpieces in sequence comprising, first means for moving said workpieces to each of said test stations in a predetermined sequence, a data card reader having a plurality of card reading stations for simultaneously reading a portion of a plurality of data cards in a sequential manner, each of said reading stations corresponding to one of said test stations, said reader including second means for simultaneously indexing said data cards between successive reading stations in synchronism with the movement of the associated workpiece between successive test stations, first control means for actuating the operation of said first means and said second means in synchronism, second control means for simultaneously actuating the tests of said test stations on said workpieces in sequence in response to the data read by and transmitted from the corresponding reading station of said reader, said second control means being connected between said reader and said test stations.

6. Data handling apparatus, comprising materials handling means including a plurality of successive operations stations for simultaneously performing predetermined operations on a plurality of workpieces at said operations stations; data card means for each of said workpieces having an individual group of coded data markings corresponding to each of said plurality of operations stations; and a card reading device having means for receiving said data cards and for simultaneously moving a plurality of said data cards past a plurality of reading stations identical in number and corresponding to said plurality of operations stations; said data cards cooperating with said reading stations to simultaneously actuate said corresponding operations stations to simultaneously perform operations determined by the different corresponding groups of coded data markings of said data card.

7. In a data handling system, in combination; materials handling means including a plurality of successive operations stations for simultaneously performing predetermined operations on a like plurality of workpieces disposed at said stations; said materials handling means being operative to simultaneously move each of said workpieces to a succeeding station after a predetermined time interval; data card means for each of said workpieces having a group of coded data markings thereon corresponding to each of said plurality of stations of said material handling means; a card reading device having means for receiving said data card means and moving said data card means successively past a plurality of reading stations identical in number and corresponding to said plurality of operations stations; said data cards cooperating with said reading stations to simultaneously actuate said corresponding operations station to simultaneously perform operations determined by said corresponding groups of coded data markings of said data card means.

8. A data card reader for simultaneously reading portions of the data from each of a plurality of data cards in a sequential manner comprising, a plurality of reading stations, each of said stations being adapted to simultaneously read a different predetermined portion of the data on said data cards, first means for simultaneously indexing each of said cards between successive stations in a predetermined sequence, and second means for actuating the operation of said first means in response to an applied control signal.

9. A data card reader for simultaneously reading and transmitting portions of the data from each of a plurality of data cards in a sequential manner comprising, a plurality of reading stations disposed adjacent to each other in a predetermined order, first means for simultaneously indexing said cards from station to station in a predetermined sequence in response to periodic applied control signals, each of said reading stations being simultaneously actuated by the presence of predetermined data on the portion of the data card being read to simultaneously provide a plurality of predetermined output signals.

10. A data card reader for simultaneously reading and transmitting portions of the data from each of a plurality of data cards in a sequential manner comprising, a plurality of separate reading stations disposed adjacent to each other in a predetermined order, first means for simultaneously indexing said cards from station to station in a predetermined sequence in response to periodic applied control signals, said first means comprising a slider member disposed adjacent to each of said reading stations, second means for advancing and returning said slider member with respect to said reading stations when said control signals are applied, said slider member including third means for engaging and moving said cards in the advancing direction, and fourth means for preventing the cards from moving with said slider member in the returning direction, each of said reading stations being simultaneously actuated by the presence of predetermined data on the portion of the data card being read to simultaneously provide a plurality of predetermined output signals.

11. A data card reader for simultaneously reading and transmitting portions of the data from each of a plurality of data cards in a sequential manner, comprising, a plurality of reading stations disposed adjacent to each other in a predetermined order, first means for simultaneously indexing said cards from station to station in a predetermined sequence in response to periodic applied control signals, said first means comprising a slider member disposed adjacent to each of said reading stations, second means for advancing and returning the slider members with respect to said reading stations when said control signals are applied, said slider members each including third means for engaging and moving said cards in the advancing direction, and fourth means for preventing the cards from moving with said slider member in the returning direction, each of said reading stations including electrical contacts simultaneously actuated by the presence of predetermined holes on the portion of the data card being read to simultaneously provide a plurality of predetermined output signals.

12. A data card reader for simultaneously reading and transmitting portions of the data from each of a plurality of data cards in a sequential manner comprising, a plurality of reading stations disposed adjacent to each other in a predetermined order, first means for indexing said cards from station to station in a predetermined sequence in response to periodic applied control signals, said first means comprising a slider member disposed adjacent to each of said reading stations, reciprocating means for advancing and returning each slider member with respect to said reading stations when said control signals are applied, said slider member including finger means for engaging and moving said cards in the advancing direction, and second means for preventing the cards from moving with said slider member in the returning direction, each of said reading stations being simultaneously actuated by the presence of predetermined data on the portion of the data card being read to simultaneously provide a plurality of predetermined output signals.

13. A data card reader for simultaneously reading and transmitting portions of the data from each of a plurality of data cards in a sequential manner comprising, a plurality of separate reading stations disposed adjacent to each other in a predetermined order, first means for simultaneously indexing said cards from station to station in a predetermined sequence in response to periodic applied control signals, each of said reading stations being simultaneously actuated by the presence of predetermined data on the portion of the data card being read to simultaneously provide a plurality of predetermined output signals, and second means disposed adjacent to the last reading station for receiving and recording additional data on said data cards when said cards leave said last reading station.

References Cited in the file of this patent

UNITED STATES PATENTS

| | | |
|---|---|---|
| 2,637,096 | Luhn | May 5, 1953 |
| 2,704,186 | Braun | Mar. 15, 1955 |
| 2,741,732 | Cunningham | Apr. 10, 1956 |
| 2,759,670 | Beach | Aug. 21, 1956 |
| 2,905,891 | Duenke et al. | Sept. 22, 1959 |